(12) United States Patent
Mitchem et al.

(10) Patent No.: US 12,566,979 B1
(45) Date of Patent: Mar. 3, 2026

(54) HIERARCHICAL ARTIFICIAL INTELLIGENCE SYSTEM

(71) Applicant: United Services Automobile Association (USAA), San Antonio, TX (US)

(72) Inventors: Sean C. Mitchem, San Antonio, TX (US); Curtis M. Bell, San Antonio, TX (US); Qunying Kou, San Antonio, TX (US); Michael J. Maciolek, Boerne, TX (US); Donnette Moncrief Brown, San Antonio, TX (US); Cory A. Matheson, Celina, TX (US); Yevgeniy V. Khmelev, San Antonio, TX (US); Janelle D. Dziuk, Falls City, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 872 days.

(21) Appl. No.: 17/115,448

(22) Filed: Dec. 8, 2020

Related U.S. Application Data

(60) Provisional application No. 62/945,445, filed on Dec. 9, 2019.

(51) Int. Cl.
| | |
|---|---|
| *G06N 5/04* | (2023.01) |
| *G06N 20/00* | (2019.01) |
| *G10L 15/18* | (2013.01) |
| *G10L 15/22* | (2006.01) |
| *G10L 25/63* | (2013.01) |
| *H04L 67/10* | (2022.01) |

(52) U.S. Cl.
CPC .............. *G06N 5/04* (2013.01); *G06N 20/00* (2019.01); *G10L 15/1815* (2013.01); *G10L 15/22* (2013.01); *G10L 25/63* (2013.01); *H04L 67/10* (2013.01)

(58) Field of Classification Search
CPC ...... G06N 5/04; G06N 20/00; G10L 15/1815; G10L 15/22; G10L 25/63
See application file for complete search history.

(56) References Cited

U.S. PATENT DOCUMENTS

| | | | | |
|---|---|---|---|---|
| 2018/0322403 A1* | 11/2018 | Ron | .......................... | G06N 3/09 |
| 2018/0337872 A1* | 11/2018 | Fawcett | .................... | G06F 8/31 |
| 2019/0325868 A1* | 10/2019 | Lecue | ..................... | G10L 25/63 |
| 2020/0137230 A1* | 4/2020 | Spohrer | .............. | H04M 7/0027 |
| 2020/0372055 A1* | 11/2020 | Joko | ..................... | G06F 40/268 |

* cited by examiner

*Primary Examiner* — Sherrod L Keaton
(74) *Attorney, Agent, or Firm* — BakerHostetler

(57) ABSTRACT

A hierarchical artificial intelligence (AI) system may comprise a maestro AI and one or more specialized AI's. The maestro AI may determine a first communication from a user device. Based on the first communication, the maestro AI may determine a first specialized AI configured to respond to the user device. The maestro AI may route the user device to the first specialized AI. The maestro AI may determine a second communication from the user device. Based on the second communication, the maestro AI may determine a second specialized AI configured to respond to the user device. The maestro AI may route the user device to the second specialized AI. The maestro AI may send the second specialized AI at least a portion of a communication between the user device and the first specialized AI.

21 Claims, 6 Drawing Sheets

FIG. 1

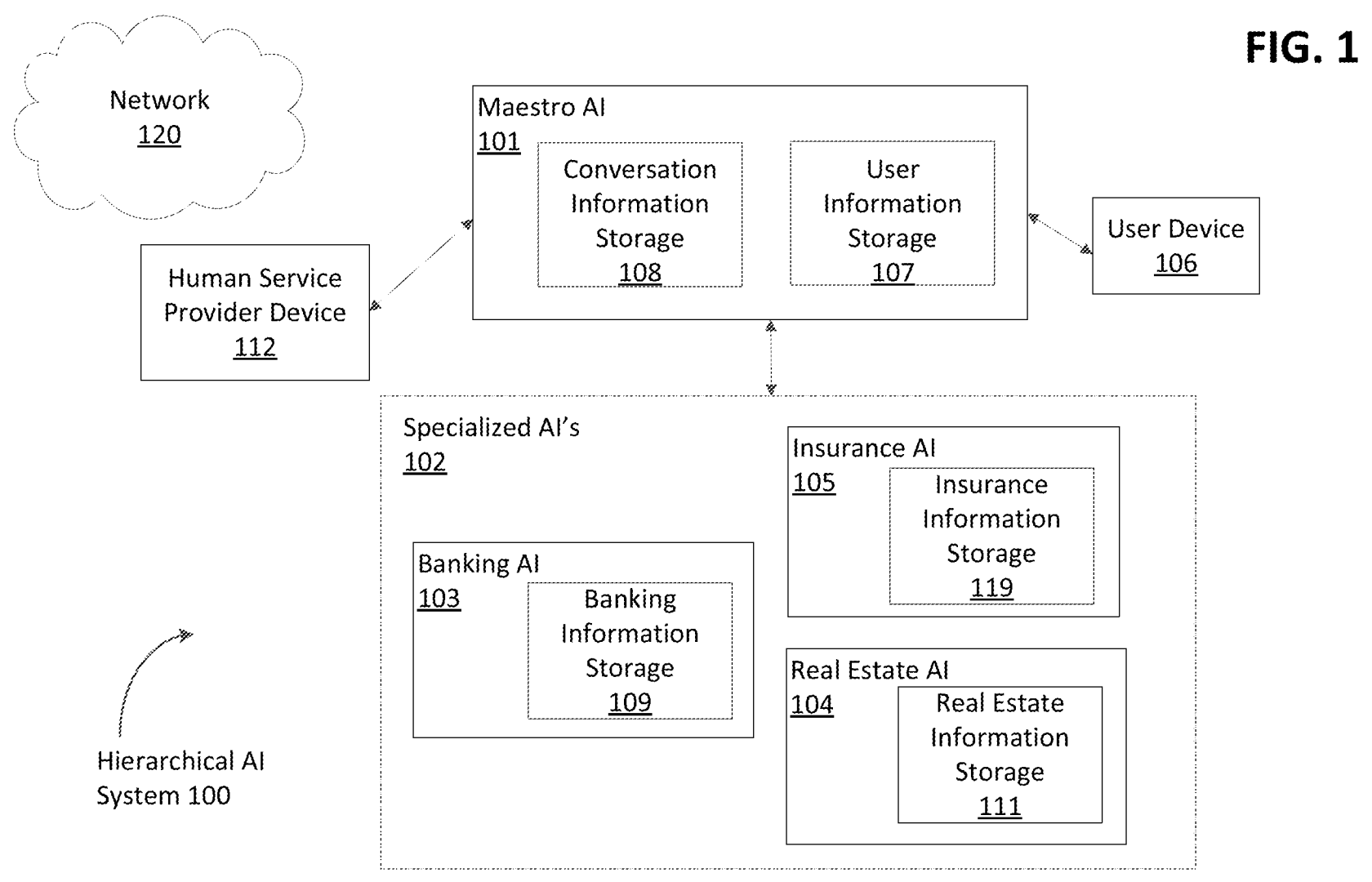

User Device 106

Maestro AI 101
- User Information Storage 107
- Conversation Information Storage 108

Network 120

Human Service Provider Device 112

Specialized AI's 102

Insurance AI 105
- Insurance Information Storage 119

Real Estate AI 104
- Real Estate Information Storage 111

Banking AI 103
- Banking Information Storage 109

Hierarchical AI System 100

400

Determine a first communication from a user device
410

Determine a first specialized AI
411

Route the user device to the first specialized AI
412

Determine a second communication from the user device
413

Determine a second specialized AI
414

Route the user device to the second specialized AI
415

500

Determine a first communication from a user device
510

Determine a first device
511

Route the user device to the first device
512

Determine a second communication from the user device
513

Determine a second device
514

Route the user device to the second device
515

HIERARCHICAL ARTIFICIAL INTELLIGENCE SYSTEM

CROSS-REFERENCE TO RELATED APPLICATION

This patent application claims priority to and the benefit of pending provisional patent application 62/945,445 filed Dec. 9, 2019, which is incorporated herein by reference in its entirety.

BACKGROUND

Artificial intelligence computing systems ("AI's") have many practical applications. For example, AI's may be used in customer service. AI's may replace or supplement human customer service representatives. The potential for an AI to perform operations efficiently, accurately, or intelligently may be limited by the AI's computing resources and/or computing capacity.

SUMMARY

A hierarchical system of AI's in which each AI has a different authority level, stored memory, and/or configurations may be capable of performing more complex operations than a traditional AI and/or system of AI's. The system may comprise one or more specialized AI's. The system may comprise a maestro AI. The maestro AI may be configured to route a user device to and/or from one or more of the specialized AI's. The maestro AI may determine which specialized AI device to route the user device based on a communication from the user device, such as based on a keyword, a requested operation, a change in topic, and/or an emotion associated with the communication from the user device. The maestro AI may route the user device to and/or from one or more of the specialized AI's in a manner that appears seamless from the perspective of the user device and/or a user of the user device.

BRIEF DESCRIPTION OF THE DRAWINGS

The following drawings show generally, by way of example, but not by way of limitation, various examples discussed in the present disclosure. In the drawings:

FIG. 1 shows an example hierarchical AI system.

DETAILED DESCRIPTION

Figure 2:
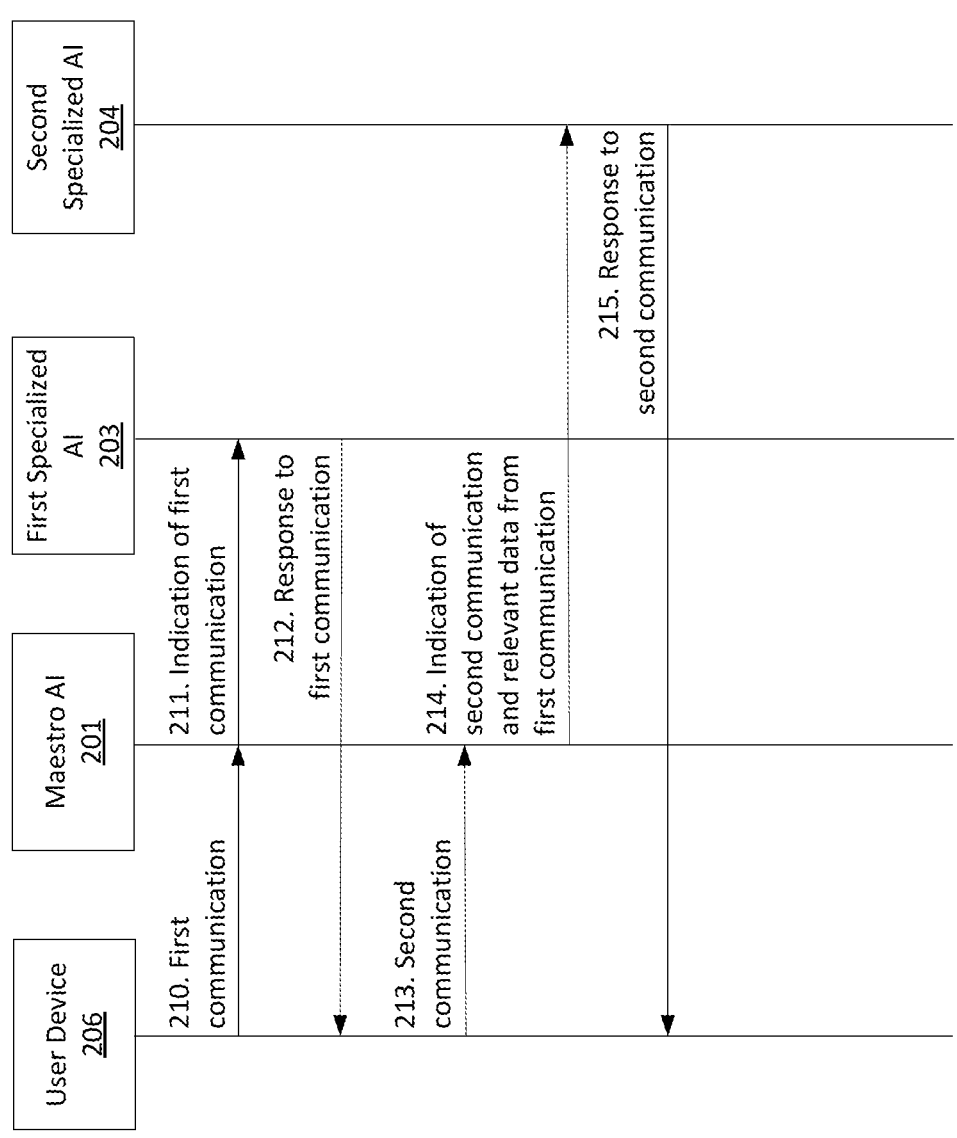
FIG. 2 shows an example hierarchical AI system.

FIG. 1 shows an example hierarchical AI system 100. The system 100 may comprise a plurality of AI's 101, 102. One or more of the AI's 101, 102 of the system 100 may comprise a device. For example, the system 100 may comprise a cloud computing system and an AI 101, 102 of the system 100 may comprise a cloud computer. As another example, the system 100 may comprise a neural network and an AI 101, 102 of the system 100 may comprise a node of the neural network.

Two or more of the AI's 101, 102 of the system 100 may comprise distinct software modules on a common device. Two or more of the AI's 101, 102 of the system 100 may comprise distinct hardware modules on a common device.

For example, one of the AI's 101, 102 may comprise a first processor and/or first memory of a device and another of the AI's 101, 102 may comprise a second processor and/or second memory of the device. Two or more of the AI's 101, 102 of the system 100 may comprise distinct partitions of a common hard drive. One or more of the AI's 101, 102 may comprise processes, such as processes running on a same computing system. The AI's 101, 102 may comprise processes running concurrently.

One or more of the AI's 101, 102 of the system 100 may be configured to communicate via a network 120. The network 120 may comprise an Internet network, a cable-optic network, a cable network, a Wi-Fi network, a 4G network, a 5G network, a cellular network, a broadband network, and/or another wireless network. The network 120 may comprise a wired network.

The AI's 101, 102 may have different permissions and/or authority levels. The permissions or authority levels may determine what AI's 101, 102 may control other AI's 101, 102. For example, an first AI 101, 102 with a higher authority level than a second AI 101, 102 may terminate an operation performed and/or a communication sent by the second AI 101, 102. The permissions and/or authority levels may determine what data the AI's 101, 102 can access, save, share, and/or modify. The permissions and/or authority levels may determine that the AI's 101, 102 must receive and/or give permission to and/or from another AI 101, 102 to access, save, share, and/or modify data. The permissions and/or authority levels may determine what data the AI's 101, 102 can perform and/or execute. The permissions and/or authority levels may determine that the AI's 101, 102 must receive and/or give permission to and/or from another AI 101, 102 to perform and/or execute an operation.

The system may comprise one or more specialized AI's 102. The specialized AI's 102 may be configured to perform different operations. The specialized AI's 102 may comprise different computing resources and/or computing capabilities. The specialized AI's 102 may have access to different storage. The specialized AI's 102 may have different permissions and/or authority levels.

The system 100 may comprise a maestro AI 101. The maestro AI 101 may comprise a device. The maestro AI 101 may comprise a different device than a device of one or more of the specialized AI's 102. The maestro AI 101 may comprise hardware. For example, the maestro AI 101 and a specialized AI 102 may be on a same device but may comprise different hardware (e.g., processors, memory, etc.) of the device. The maestro AI 101 may comprise different computing resources and/or capabilities than one or more of the specialized AI's 102. For example, the maestro AI 101 may comprise greater storage than one or more of the specialized AI's 102. The maestro AI 101 may have greater computing power than one or more of the specialized AI's 102.

The maestro AI 101 may comprise software and/or a program. The maestro AI 101 may comprise an application programming interface (API). For example, the maestro AI 101 may comprise an API between the user device 106 and one or more of the specialized AI's 102. The maestro AI 101 may comprise an API between one or more of the specialized AI's 102.

The maestro AI 101 may comprise language recognition capabilities. For example, the maestro AI 101 may comprise voice-to-text capabilities, such as the capability to convert speech data received from a device (e.g., the user device 106) to text. The maestro AI 101 may be configured to convert speech to text and send the text to one or more of the specialized AI's 102. The maestro AI 101 may be configured to recognize one or more keywords from audio and/or text. The maestro AI 101 may send an indication of the one or more keywords to one or more of the specialized AI's 102. The maestro AI 101 may be configured to recognize emotion, such as based on spoken or written language, voice volume, voice pitch, speaking pace, and/or other indicators of emotion. The maestro AI 101 may send an indication of a determined emotion to one or more of the specialized AI's 102.

The maestro AI 101 may be configured to coordinate operations between other specialized AI's 102. The maestro AI 101 may be configured to communicate with a user device 106. The maestro AI 101 be configured to route the user device 106 from one specialized AI 102 of the system 100 to another specialized AI 102 of the system 100. The user device 106 may comprise a client device. One or more of the maestro AI 101 or the specialized AI's 102 may comprise servers. The maestro AI 101 may route the user device 106 from and/or to one or more specialized AI's 102 based on recognized language, such as keywords used, in a communication from the user device 106. The language may be indicative of functionality, assistance, and/or information that a user of the user device 106 requests. One of the specialized AI's 102 may be configured to provide the requested functionality, assistance, and/or information and the maestro AI 101 may route the user device 106 to that specialized AI 102.

The maestro AI 101 may route the user device 106 from and/or to one or more specialized AI's 102 based on a determined emotion. Different specialized AI's 102 may be pre-programmed to communicate using different tones and/or communication styles. For example, specialized AI's 102 may be pre-programmed to give similar to responses to questions, but using different words. The specialized AI's 102 may be programmed with different response sets and the responses in the sets may have different tones and/or styles. The response sets may comprise tables, lists, and/or other data sets. The response sets may comprise responses mapped to contents of a communication from the user device 106, such as a user input, a keyword, an information request, and/or a query.

The maestro AI 101 may be configured to route the user device 106 from and/or to one or more specialized AI's 102 based on a communication received from the user device 106. For example, the maestro AI 101 may be configured to route the user device 106 to a specialized AI 102 that is configured to respond and/or to fulfill the a request from the user device 106. The maestro AI 101 may route the user device 106 from and/or to one or more specialized AI 102 based on a change in topic in communications with the user device 106. For example, the maestro AI 101 may be configured to route the user device 106 to a specialized AI 102 that is configured to address a new topic.

The maestro AI 101 may be configured to route the user device 106 from one specialized AI 102 to another specialized AI 102 in a manner that appears seamless from the perspective of the user device 106 and/or or a user of the user device 106. For example, the transition from the first specialized AI 102 to the other specialized AI 102 may not be observable to a user of the user device 106. For the perspective of the user, it may appear that the two AI's 102 are a same device and/or that the user device 106 is communicating with a single device.

An apparently seamless transition may be achieved using one of a variety of features. For example, an apparently seamless transition may be achieved by the maestro AI 101 being configured to send information to a specialized AI 102 based on routing the user device 106 to the specialized AI 102. The maestro AI 101 may listen to and/or track multiple segments or an entirety of communications with the user device 106. For example, the maestro AI 101 may have access to communications between the user device 106 and one or more of the specialized AI's 102, even after the user device 106 is routed from one specialized AI 102 to another specialized AI 102. Based on listening to and/or tracking multiple segments and/or an entirety of communications, the maestro AI 101 may determine a context of the communications with the user device. The maestro AI 101 may record and/or save an indication of one or more communications with the user device and/or information conveyed in the communications. The maestro AI 101 may send an indication of the context, the record, and/or information to one or more of the specialized AI's. Based on routing the user device 106 from a first specialized AI 102 to a second specialized AI 102, the maestro AI 101 may send the second specialized AI 102 a transcript of a conversation between a user of the user device 106 and/or the user device 106 and the first specialized AI 102. The maestro AI 101 may determine information from communications between the user and/or the user device 106 and the first specialized AI 102 that may be relevant to communications and/or operations of the second specialized AI 102. The maestro AI 101 may determine information associated with the user device 106 and/or a user of the user device 106, such as from a database of user information, that may be relevant to communications and/or operations of the second specialized AI 102. The maestro AI 101 may send an indication of the determined information to the second specialized AI 102. As a result of having the transcript and/or information, the second specialized AI 102 may not have to ask a user of the user device 106 to provide the information.

The maestro AI 101 may comprise machine learning capabilities that contribute to the apparent seamlessness of transitions between AI's. For example, the maestro AI 101 may be configured to train on the communications with the user device 106 and/or a user of the user device 106. The maestro AI may be configured to train on communications with the user device 106 during a conversation, such as over one or more consecutive communication sessions with one or more specialized AI's 102. The maestro AI may be configured to train on a set of data comprising past communications with the user device 106. The past communications may be stored to the user information storage 107, the conversation information storage 108, and/or a database external to the maestro AI 101. Based on the training on the information, the maestro AI 101 may be configured to determine responses and/or information for the user device 106 and/or the user. For example, the maestro AI 101 may determine a response that has been well-received by a user of the user device 106. Determining that the response has been well-received may be based on words used by a user of the user device 106 (e.g., words having a positive connotation), a tone of speech text received from the user device 106, and/or a rating received from the user device 106. The maestro AI 101 may determine an answer to a question based on the training. The maestro AI 101 may be configured to prompt one or more of the specialized AI's 102 and/or a human service provider to provide the determined response or information, such as based on information, a request, and/or another communication from the user device 106.

An apparently seamless transition may be achieved based on there being a short period of time between a first specialized AI 102 communicating with the user device 106 and a second specialized AI 102 communicating with the user device 106. For example, the second specialized AI 102 may be configured to respond to the user device 106 within 30 seconds, 1 minute, 90 seconds, or 2 minutes of the first specialized AI 102 responding to the user device. The period of time may be the same as or similar to a time for the first specialized AI 102 to respond to a communication from the user device during a communication session between the user device and the first specialized AI 102. The period of time may be the same or similar to a period of time between subsequent communications from the first specialized AI 102 to the user device 106 during a communication session between the first specialized AI 102 and the user device 106. The apparently seamless transition may be achieved based on a time for the first specialized AI 102 to respond to the user device being similar to a time for the second specialized AI 102 to respond to the user device. For example, the first specialized AI 102 may be configured to respond to the user device X seconds after receiving a communication from the user device or from the maestro AI 101. X seconds may comprise any range of numbers or number in the ranges 0-10 seconds, 10-20 seconds, 20-30 seconds, 30-60 seconds, or 60-90 seconds as examples. The second specialized AI 102 may be configured to respond to the user device X+Y seconds after receiving a communication from the user device or from the maestro AI 101. The second specialized AI 102 may be configured to respond to the user device no more than X+Y seconds after receiving the communication from the user device or from the maestro AI 101. Y seconds may comprise any range of numbers or number in the ranges 0-1 second, 1-5 seconds, 5-10 seconds, 10-15 seconds, 15-20 seconds, 20-25 seconds, or 25-30 seconds, as examples.

If the user of the user device 106 is communicating via text communications, an apparently seamless transition may be achieved by communications sent by one or more of the specialized AI's 102 being similar, such as in tone and/or diction. If the user of the user device 106 is communicating via speech communications, one or more of the specialized AI's 102 may have artificial speech generation capabilities. The one or more specialized AI's 102 may be configured to generate and/or use similar artificial voices. For example, the specialized AI's 102 may generate and/or use voices that are similar in tone, pitch, pace, volume, diction, and/or inflection.

The specialized AI's 102 of the system 100 may be configured to perform specific operations. As a non-limiting example, FIG. 1 shows AI's configured to perform operations associated with a company and/or entity that provides services to users, such as financial, real estate, and/or insurance services. However, the system 100 may comprise specialized AI's 102 configured to perform any operations.

The system may comprise a specialized banking AI 103. The banking AI 103 may be configured to perform banking services for a user, such as a user of the user device 106. For example, the banking AI 103 may be configured to open, freeze, and/or close a bank account for the user. The banking AI 103 may be configured to approve the user for an account and/or banking card. The banking AI 103 may be configured to process a deposit, transfer, withdrawal, and/or payment for the user.

The banking AI 103 may be configured to provide information associated with banking to the user, such as via the user device 106. For example, the banking AI 103 may be configured to determine and/or provide a status of an account, a balance of an account, and/or a status of a payment and/or transfer from an account. The banking AI

103 may comprise and/or have access to banking information storage 109. The banking information storage 109 may comprise information stored to a memory, such as a memory of the banking AI 103. The banking information storage 109 may comprise a database, such as a database external to the banking AI 103. The banking AI 103 may be configured to provide information from the banking information storage 109 to the user via the user device 106.

The system 100 may comprise a real estate AI 104. The real estate AI 104 may be configured to perform one or more operations associated with real estate for the user, such as via the user device 106. For example, the real estate AI 104 may be configured to receive, review, deny, and/or approve an application for a loan for real estate. The real estate AI 104 may be configured to process a search for real estate, such as by determining available real estate for purchase or rent based on one or more criteria received from the user device 106. The real estate AI 104 may be configured to generate, receive, and/or process documentation of a closing of a sale for real estate. The real estate AI 104 may initiate and/or process transfer of a title for real estate.

The real estate AI 104 may be configured to provide information associated with real estate to the user, such as via the user device 106. For example, the real estate AI 104 may be configured to provide results of a search for available real estate, such as based on one or more criteria received from the user. The real estate AI 104 may be configured to report current mortgage rates. The real estate AI 104 may be configured to provide contact information associated with real estate agents, real estate appraisers, real estate inspectors, real estate lawyers, mortgage companies, real estate renovation companies, real estate repair companies, appliance companies, and/or interior design and/or decorating companies.

The real estate AI 104 may comprise and/or have access to real estate information storage 111. The real estate information storage 111 may comprise information stored to a memory, such as a memory of the real estate AI 104. The real estate information storage 111 may comprise a database, such as a database external to the real estate AI 104. The real estate AI 104 may be configured to provide information from the real estate information storage 111 to the user via the user device 106.

The system 100 may comprise an insurance AI 105. The insurance AI 105 may be configured to perform one or more operations associated with insurance for the user, such as via the user device 106. For example, the insurance AI 105 may be configured to receive, review, deny, and/or approve an application for an insurance policy. The insurance policy may comprise a policy for automobile or property insurance, such as insurance covering an automobile, a home, a condominium, a rental property, a dwelling property, valuable personal property, and/or an umbrella policy. The insurance policy may comprise flood or windstorm insurance. The insurance policy may comprise recreation products insurance, such as insurance covering aviation, a boat, jet skis, a motorcycle, a scooter, or a motorhome. The insurance policy may comprise specialty automobile insurance, such as insurance covering a collector vehicle, an antique automobile, a business or commercial automobile, a tourist vehicle, and/or a personal automobile. The insurance property may comprise pet insurance. The insurance policy may comprise life, health, dental, and/or optical insurance policy. The insurance policy may comprise business insurance, such as bond, business/commercial automobile, business owner, commercial builder, commercial umbrella, professional liability, tractor and equipment, workers compensation, and/or farm and ranch insurance.

The insurance AI 105 may be configured to receive, review, and/or process an insurance claim, such as under an existing insurance policy. Processing the claim may comprise determining if the existing insurance policy covers the claim, such as an event, an individual, and/or property associated with the claim. Processing the claim may comprise determining whether a deductible has been met. Processing the claim may comprise determining a compensation amount and issuing a payment for the compensation, such as to the user submitting the claim and/or to another party involved in an event associated with the claim. Processing the claim may comprise deducting an unmet amount of a deductible from the compensation amount and issuing a payment for the difference. Processing the claim may comprise determining a service provider to provide a service associated with the claim, such as a repair company, and sending an indication of the service provider and/or sending a communication to the service provider. Processing the claim may comprise sending a communication to another insurance provider, such as a provider of an insurance plan covering another party involved in an event associated with the claim.

The insurance AI 105 may comprise and/or have access to insurance information storage 119. The insurance information storage 119 may comprise information stored to a memory, such as a memory of the insurance AI 105. The insurance information storage 119 may comprise a database, such as a database external to the insurance AI 105. The insurance AI 105 may be configured to provide information from the insurance information storage 119 to the user via the user device 106.

The maestro AI 101 may be configured to determine to route the user device 106 from a first specialized AI 102 to a second specialized AI 102 based on a determination of a specific operation to be performed and the second specialized AI 102 being configured to perform that specific operation. The first specialized AI 102 may not be configured to perform the specific operation or may not have the functionality to perform the specific operation as well and/or as efficiently as the second specialized AI 102.

Routing the user device 106 from a first specialized AI 102 to a second specialized AI 102 may comprise tearing down a communication session between the user device 106 and the first specialized AI 102. A communication session may comprise a transport control protocol (TCP) session, a user datagram protocol (UDP) session, a HyperText Transfer Protocol (HTTP) session, a Real-Time Transfer Protocol (RTP) session, an open sessions interconnection (OSI) model session, and/or a session internet protocol (IP) session. The communication session may be torn down by sending an indication that the communication session is over to the user device 106 and/or the first specialized AI 102. For example, if the communication session comprises a TCP session, the maestro AI 101 may send a FIN message to the user device 106, the first specialized AI 102, and/or any other devices involved in the communication session. The communication session may be torn down by initiating a communication session between the user device 106 and the second specialized AI 102.

Routing the user device 106 from a first specialized AI 102 to a second specialized AI 102 may comprise initiating a communication session between the user device 106 and the second specialized AI 102. Initiating the communication session may comprise sending an indication of an address of the user device 106 to the second specialized AI 102, sending an indication of an address of the second specialized AI 102 to the user device 106, sending an encryption key (e.g., a public key) of the user device 106 to the second specialized AI 102, sending an encryption key of the second specialized AI 102 to the user device 106, sending a digital certificate of the user device 106 to the second specialized AI 102, sending a digital certificate of the second specialized AI 102 to the user device 106, and/or sending a command to one or both of the user device 106 and/or the second specialized AI 102 to initiate the communication session. If the specialized AI's comprise processes, routing the user device 106 from a first specialized AI 102 to a second specialized AI 102 may comprise initiating a new process and/or thread.

As a non-limiting, illustrative example, the user device 106 may be communicating with the real estate AI about purchasing a house. A user of the user device 106 may submit a query about their credit score. Based on the query, the maestro AI 101 may route the query to the banking AI 103, initiate a communication session between the user device 106 and the banking AI 103, and/or tear down a communication session between the user device 106 and the real estate AI 104.

To achieve a seamlessness effect, the maestro AI 101 may send the banking AI 103 a transcript of communications between the user device 106 and the real estate AI 104. The transcript may indicate that a user of the user device 106 is looking to buy a house within a certain price range. Using the transcript, the banking AI 103 may provide the user device 106 with information about financing a house within the price range without having to ask the user device 106 about the price range. A user of the user device 106 may not detect that the user device 106 was transferred form the real estate AI 104 to the banking AI 103, such as because the user is not having to re-supply information during the communication session.

The maestro AI 101 may comprise one or more storage units 107, 108. The storage units 107, 108 may be on a same device as the maestro AI 101. The storage units 107, 108 may be on one or more devices in communication with a device where the maestro AI 101 resides. The storage units 107, 108 may comprise a user information storage 107. The maestro AI 101 may be configured to store information associated with a user, such as a user of the user device 106, and/or information associated with the user device 106 in the user information storage 107.

The maestro AI 101 may comprise a conversation information storage 108. The maestro AIA 101 may be configured to store information associated with a communication session with the user device 106 in the conversation information storage 108. For example, the maestro AIA 101 may be configured to store information associated with a conversation between the user device 106 and an AI 102 of the system 100. Based on routing the user device 106 from one specialized AI 102 of the system 100 to another specialized AI 102 of the system 100, the maestro AI 101 may be configured to determine relevant information stored in one or more of the storage units 107, 108. For example, the maestro AI 101 may be configured to determine the relevant information before, during, or after routing the user device 106. The maestro AI 101 may be configured to provide the determined stored information to the other specialized AI 102 of the system 100 after passing the user to the other specialized AI 102. The other specialized AI 102 may use the information to make decisions and/or perform one or more operations. The other specialized AI 102 may communicate at least a portion of the data to the user device 106.

The maestro AI 101 may train on data stored to the storage 107, 108. For example, the maestro AI 101 may use the data stored to the storage 107, 108 to predict a response, a suggestion, a question, and/or other data to send to the user device 106. The maestro AI 101 may send the determined data to a specialized AI 102 that is communicating with the user device 106.

The maestro AI 101 may have higher permissions and/or authority level than other AI's 102 in the system 100, such as the specialized AI's 102. As an example, the maestro AI 101 may be configured to authorize one or more AI's 102 in the system 100 to perform an operation. The operation may comprise communicating with the user device 106 and/or other AI's 101, 102, as an example. The operation may comprise accessing data, such as data stored in a central repository of the system 100. The maestro AI 101 may be configured to grant, deny, and/or revoke permissions of other AI's in the system 100. The maestro AI 101 may be configured to override and/or terminate operations performed by other AI's in the system 100.

The maestro AI 101 may have access rights to sensitive information, such as personal identifying information. One or more specialized AI's 102 may not have access rights to sensitive information. The maestro AI 101 may prevent the sensitive information from being exposed to the specialized AI's 102. For example, the maestro AI 101 may relay communications from the user device 106 to the specialized AI's 102. The maestro AI 101 may encrypt and/or remove any sensitive information from the communications before they are sent to the specialized AI's 102. Additionally or alternatively, the maestro AI 101 may flag sensitive information for the specialized AI's 102. The specialized AI's 102 may be configured to store and/or process the sensitive information differently than they would non-sensitive information. If the communications between the user device 106 and the specialized AI's 102 is audio, the maestro AI 101 may censor and/or remove sensitive information in the speech data from the user device 106, such as before relaying the data to a specialized AI 102 or as the data is being transmitted to the specialized AI 102.

The system 100 may comprise a device 112 used by a human service provider. The human service provider may comprise a customer service representative and/or a member service representative (MSR). The maestro AI 101 may be configured to determine to handoff the user device 106 to the human service provider device 112. For example, the user device 106 may be communicating with one of the specialized AI's 102. Based on a user input via the user device 106 and/or a communication received from the user device 106, the maestro AI 101 may be configured to determine to route the user device to the human service provider device 112.

The maestro AI 101 may be configured to route the user device 106 to and/or from the human service provider device 112 based on recognized language, such as keywords used. The language may be indicative of functionality, assistance, and/or information that a user of the user device 106 needs. The human service provider may be determined to be capable and/or be assigned responsibilities of providing the needed functionality, assistance, and/or information. The maestro AI 101 may be configured to route the user device 106 to and/or from the human service provider device 112 based on determined emotion. For example, if the maestro AI 101 determines a negative emotion (e.g., anger, sadness, doubt, reluctance, annoyance, etc.) the maestro AI 101 may be configured to route the user device 106 to the human service provider device 112 so that a human may address the user's needs in a more personalized manner than an AI could provide. If the maestro AI 101 determines a change in emotions, the maestro AI 101 may be configured to route the user device 106 to the human service provider device 112. The maestro AI 101 may route the user device 106 to the human service provider device 112 based on a change in conversation topic. The maestro AI 101 may route the user device 106 to the human service provider device 112 based on a request received from the user device 106.

Routing the user device 106 to the human service provider device 112 may comprise initiating a communication session between the user device 106 and the human service provider device 112. Initiating the communication session may comprise sending an indication of an address of the user device 106 to the human service provider device 112, sending an indication of an address of the human service provider device 112 to the user device 106, sending an encryption key (e.g., a public key) of the user device 106 to the human service provider device 112, sending an encryption key of the human service provider device 112 to the user device 106, sending a digital certificate of the user device 106 to the human service provider device 112, sending a digital certificate of the human service provider device 112 to the user device 106, and/or sending a command to one or both of the user device 106 and/or the human service provider device 112 to initiate the communication session.

The maestro AI 101 may be configured to route the user device 106 to and/or from the human service provider device 112 in a manner that appears seamless from the perspective of the user device 106 and/or or a user of the user device 106. For example, the transition from to and/or from the human service provider device 112 may not be observable to a user of the user device 106. For the perspective of the user, it may appear that a specialized AI 102 and the human service provider device 112 are a same device and/or that the user device 106 is communicating with a single device.

A seamless transition may be achieved using one of a variety of features. For example, there may be a short period of time between a specialized AI 102 communicating with the user device 106 and the human service provider device 112 communicating with the user device 106. The period of time may be the same as or similar to a time for the specialized AI 102 to respond to a communication from the user device during a communication session between the user device 106 and the specialized AI 102. The period of time may be the same or similar to a period of time between subsequent communications from the specialized AI 102 to the user device 106 during a communication session between the specialized AI 102 and the user device 106.

If the user of the user device 106 is communicating via text communications, communications sent by one or more of the specialized AI's 102 may be similar to communications sent by the human service provider, such as in tone and/or diction. If the user of the user device 106 is communicating via speech communications, one or more of the specialized AI's 102 may have artificial speech generation capabilities. The one or more specialized AI's 102 may be configured to generate an artificial voice that is similar to a voice of the human service provider in tone, pitch, pace, volume, diction, and/or inflection. The maestro AI 101 may send a specialized AI 102 a sample of a recording of speech of the human customer service representative, such as based on routing the user device 106 to the specialized AI 102. The specialized AI 102 may be configured to emulate the voice of the human service provider when outputting audio communications to the user device 106. The maestro AI 101 and/or a specialized AI 102 may determine one or more characteristics of the voice of the human customer service provider, such as tone, pitch, pace, volume, diction, and/or inflection. The maestro AI 101 may send a specialized AI 102 an indication of one or more of the characteristics, such as based on routing the user device 106 to the specialized AI 102. The specialized AI 102 may emulate the voice of the human customer service representative using one or more of the determined characteristics.

Based on routing the user device 106 to the human service provider device 112, the maestro AI 101 may be configured to send information to the human service provider device 112 to make the transition to the human service provider device 112 appear seamless. The maestro AI 101 may be configured to listen to and/or track multiple segments or an entirety of communications with the user device 106. For example, the maestro AI 101 may have access to communications between the user device 106, one or more of the specialized AI's 102, and the human service provider device 112, even after the user device 106 is routed from one specialized AI 102 to another specialized AI 102 and/or to the human service provider device 112. Based on listening to and/or tracking multiple segments and/or an entirety of communications, the maestro AI 101 may be configured to determine a context of the communications with the user device. The maestro AI 101 may be configured to record and/or save an indication of one or more communications with the user device and/or information conveyed in the communications. The maestro AI 101 may be configured to send an indication of the context, the record, and/or information to the human service provider device 112.

As an example, based on routing the user device 106 from a specialized AI 102 to the human service provider device 112, the maestro AI 101 may be configured to send the human service provider device 112 a transcript of a conversation between a user of the user device 106 and/or the user device 106 and the specialized AI 102. The maestro AI 101 may be configured to determine information from communications between the user and/or the user device 106 and the specialized AI 102 that may be relevant to communications and/or operations of the human service provider device 112. The maestro AI 101 may be configured to determine information associated with the user device 106 and/or a user of the user device 106, such as from a database of user information, that may be relevant to communications and/or operations of the human service provider device 112. The maestro AI 101 may be configured to send an indication of the determined information to the human service provider device 112. As a result of having the transcript and/or information, the human service provider may have knowledge of the information without having to ask the user of the user device 106 to provide the information.

FIG. 2 shows an example hierarchical AI system 200. The system 200 may comprise a user device (e.g., user device 106 in FIG. 1), a maestro AI 201 (e.g., maestro device 101 in FIG. 1), and one or more specialized AI's 203, 204 (e.g., specialized AI's 102 in FIG. 1). At step 210, the user device 206 may send a first communication. The first communication may comprise a request, such as a request for a service, assistance, and/or information. The first communication may comprise authentication information, such as a username, password, a digital certificate, and/or a key. The first communication may comprise a signal. The first communication may comprise a packet. The first communication may comprise a stream of packets. The first communication may comprise a text communication. The first communication may comprise an audio communication.

The user device 206 may send the first communication to the maestro AI 201. Based on the first communication, the maestro AI 201 may authenticate the user device 206, such as using the authentication information. Authenticating the user device 206 may comprise determining that the user device 206 is associated with a user that is a member or subscriber of a service. Authenticating the user device 206 may comprise determining that the user device 206 is a trusted device.

Based on the first communication, the maestro AI 201 may determine a first specialized AI 203 one of the specialized AI's 203, 204 to which to route the user device 206. The maestro AI 201 may determine the first specialized AI 203 based on contents of the first communication, such as a type of request, a topic, and/or a type of information requested or provided, etc. For example, the maestro AI may determine the first specialized AI 203 based on a keyword in the first communication. The maestro AI 201 may determine an emotion associated with the first communication and may determine the first specialized AI 203 based on the emotion. The maestro AI 201 may determine the first specialized AI 203 based on past communications with the user device 206, such as based on a record of past communications with the user device 206 stored to memory of the maestro AI 201 or a database.

At step 211, the maestro AI 201 may send an indication of the first communication. The maestro AI 201 may send the indication of the first communication to the first specialized AI 203. If the first communication comprises a packet or a stream of packets, the maestro AI 201 may send the packet and/or the stream of packets to the first specialized AI 203. The maestro AI 201 may send an indication of the contents or subject of the first communication to the first specialized AI 203. If the first communication comprises sensitive information, the maestro AI 201 may remove, encrypt, and/or flag the sensitive information.

The maestro AI 201 may route the user device 206 to the first specialized AI 203. The maestro AI 201 may route the user device 206 to the first specialized AI 203 by setting up a communication session between the user device 206 and the first specialized AI 203. If the specialized AI's 203, 204 comprise threads and/or processes, the maestro AI 201 may route the user device to the first specialized AI 203 by initiating the thread and/or process comprising the first specialized AI 203.

At step 212, the first specialized AI 203 may send a response to the first communication. The first specialized AI 203 may send the response to the first communication to the user device 206. The response may comprise a service, information, and/or a request for more information. The first specialized AI 203 may determine the response based on the first communication, such as based on contents and/or emotion of the first communication. The first specialized AI 203 may determine the response based on data stored to a memory of the first specialized AI 203 and/or a database external to the first specialized AI 203.

The response to the first communication may comprise data provided by the maestro AI 201. For example, the maestro AI 201 may intercept and/or monitor communications between the user device 206 and the specialized AI 203. Based on the communications, the maestro AI 201 may determine information and/or a response. The maestro AI 201 may prompt the first specialized AI 203 to communicate the determined information and/or response to the user device 206.

At step 213, the user device 206 may send a second communication. The second communication may comprise a response to the response from the first specialized AI 203, such as information that was requested. The second communication may comprise a request, such as for a service. The second communication may comprise a query. The user device 206 may send the second communication to the first specialized AI 203. The maestro AI 201 may monitor and/or intercept network traffic to the first specialized AI 203 and may examine the second communication. The user device 206 may send the second communication to the maestro AI 201. The user device 206 may send the second communication to the first specialized AI 203 via the maestro AI 201, such as using the maestro AI 201 as a relay. The second communication may comprise a text communication. The second communication may comprise an audio communication.

Based on the second communication, the maestro device may determine a second specialized AI 204. For example, the maestro AI 201 may determine the second specialized AI 204 based on contents of the second communication, such as a type of request, a topic, and/or a type of information requested or provided, etc. For example, the maestro AI may determine the second specialized AI 204 based on a keyword in the first communication. The maestro AI 201 may determine an emotion associated with the second communication and may determine the second specialized AI 204 based on the emotion. The maestro AI 201 may determine the second specialized AI 204 based on the second specialized AI 204 comprising a device in the system that is assigned to operations associated with a subject of the second communication. The second specialized AI 204 may be better suited to receive and/or respond to the second communication. For example, the second specialized AI 204 may have access to a database with information needed to respond to the second communication. The second specialized AI 204 may have computing resources needed to receive, process, and/or respond to the second communication.

At step 214, the maestro AI 201 may send an indication of the second communication. The maestro AI 210 may send the indication of the second communication to the second specialized AI 204. If the second communication comprises a packet or a stream of packets, the maestro AI 210 may send the packet or stream of packets to the second specialized AI 204. The maestro AI 201 may send an indication of the contents or subject of the second communication to the second specialized AI 204. If the second communication comprises sensitive information, the maestro AI 201 may remove, encrypt, and/or flag the sensitive information.

The maestro AI 201 may route the user device 206 to the second specialized AI 204. The maestro AI 201 may route the user device 206 to the second specialized AI 204 by tearing down a communication session between the user device 206 and the first specialized AI 203. The maestro AI 201 may route the user device 206 to the second specialized AI 204 by setting up a communication session between the user device 206 and the second specialized AI 204. If the specialized AI's 203, 204 comprise threads and/or processes, the maestro AI 201 may route the user device 206 to the second specialized AI 204 by terminating the thread and/or process comprising the first specialized AI 203. The maestro AI 201 initiate the thread and/or process comprising the second specialized AI 204.

The maestro AI 201 may send relevant data from the first communication to the second specialized AI 204. The relevant data may comprise a transcript of the first communication and/or the response to the first communication. The relevant data may comprise a portion of the first communication and/or response to the first communication. The maestro AI 201 may determine the portion of the first communication and/or response to the first communication, such as based on the second communication. The maestro AI 201 may send the relevant data before sending the indication of the second communication, with the second communication, or after sending the second communication.

At step 215, the second specialized AI 204 may send a response to the second communication. The second specialized AI 204 may send the response to the second communication to the user device 206. The response may comprise a service, information, and/or a request for more information. The second specialized AI 204 may determine the response based on the second communication, such as based on contents and/or emotion of the second communication. The second specialized AI 204 may determine the response based on data stored to a memory of the second specialized AI 204 and/or a database external to the specialized AI 204.

The response to the second communication may comprise data provided by the maestro AI 201. For example, the maestro AI 201 may intercept and/or monitor communications between the user device 206 and the second specialized AI 204. Based on the communications, the maestro AI 201 may determine information and/or a response. The maestro AI 201 may prompt the second specialized AI 204 to communicate the determined information and/or response to the user device 206.

The transition between the first specialized AI 203 and the second specialized AI 204 may appear seamless to the user device 206 and/or a user of the user device 206. The transition may appear seamless based on sending the response to the first communication a period of time after the first communication was sent and/or received that is similar to or the same as a period of time between the sending and/or receiving of the second communication and the sending of the response to the second communication. The transition may appear seamless based on the first specialized AI 203 and the second specialized AI 204 using a similar generated voice and/or similar diction. The transition may appear seamless based on the maestro AI 201 providing information to the second specialized AI 204, such as from communications between the user device 206 and the first specialized AI 203 and/or from a database of information associated with the user device 206 and/or a user of the user device 206.

Figure 3:
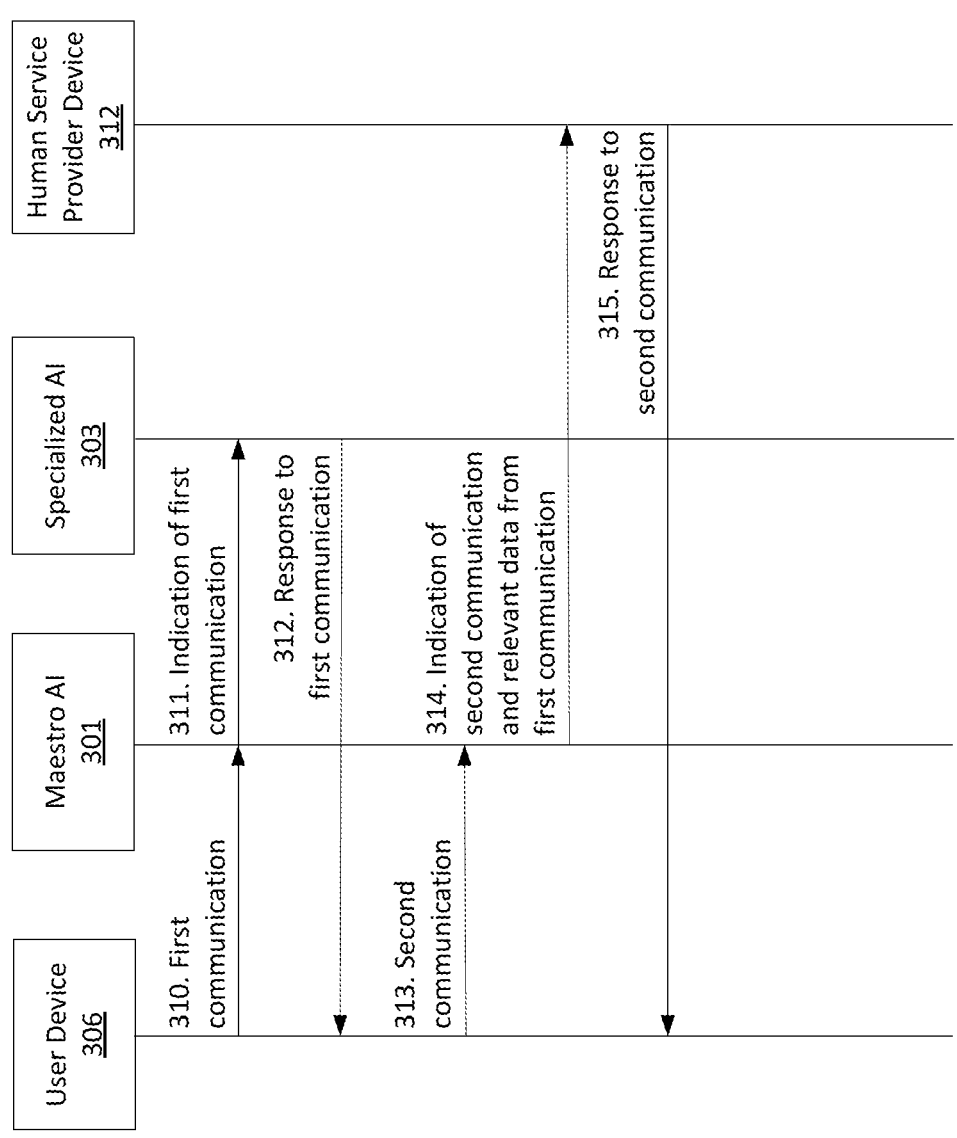
FIG. 3 shows an example hierarchical AI system.

FIG. 3 shows an example hierarchical AI system 300. The system 300 may comprise a user device 306 (e.g., user device 106 in FIG. 1, user device 206 in FIG. 2), a maestro AI 301 (e.g., maestro device 101 in FIG. 1, maestro device 201 in FIG. 2), one or more specialized AI's 303 (e.g., specialized AI's 102 in FIG. 1, specialized AI's 203, 204 in FIG. 2), and/or one or more human service provider devices 312 (e.g., human service provider device 112 in FIG. 1). At step 310, the user device 306 may send a first communication. The first communication may comprise a request, such as a request for a service, assistance, and/or information. The first communication may comprise authentication information, such as a username, password, a digital certificate, and/or a key. The first communication may comprise a signal. The first communication may comprise a packet. The first communication may comprise a stream of packets. The first communication may comprise a text communication. The first communication may comprise an audio communication.

The user device 306 may send the first communication to the maestro AI 201. Based on the first communication, the maestro AI 301 may authenticate the user device 306, such as using the authentication information. Authenticating the user device 306 may comprise determining that the user device 306 is associated with a user that is a member or subscriber of a service. Authenticating the user device 306 may comprise determining that the user device 306 is a trusted device.

Based on the first communication, the maestro AI 301 may determine one of the specialized AI's 303 to which to route the user device 306. The maestro AI 301 may determine the specialized AI 303 based on contents of the first communication, such as a type of request, a topic, and/or a type of information requested or provided, etc. For example, the maestro AI 391 may determine the specialized AI 303 based on a keyword in the first communication. The maestro AI 301 may determine an emotion associated with the first communication and may determine the specialized AI 303 based on the emotion. The maestro AI 301 may determine the specialized AI 303 based on past communications with the user device 306, such as based on a record of past communications with the user device 306 stored to memory of the maestro AI 301 or a database.

At step 311, the maestro AI 301 may send an indication of the first communication. The maestro AI 301 may send an indication of the first communication to the determined specialized AI 303. If the first communication comprises a packet or a stream of packets, the maestro AI 301 may send the packet and/or the stream of packets to the determined specialized AI 303. The maestro AI 301 may send an indication of the contents or subject of the first communication to the determined specialized AI 303. If the first communication comprises sensitive information, the maestro AI 301 may remove, encrypt, and/or flag the sensitive information.

The maestro AI 301 may route the user device 306 to the specialized AI 303. The maestro AI 301 may route the user device 306 to the specialized AI 303 by setting up a communication session between the user device 306 and the specialized AI 303. If the specialized AI 303 comprises threads and/or processes, the maestro AI 301 may route the user device 306 to the specialized AI 303 by initiating the thread and/or process comprising the specialized AI 303.

At step 312, the specialized AI 303 may send a response to the first communication. The specialized AI 303 may send the response to the first communication to the user device 306. The response may comprise a service, information, and/or a request for more information. The specialized AI 303 may determine the response based on the first communication, such as based on contents and/or emotion of the first communication. The specialized AI 303 may determine the response based on data stored to a memory of the specialized AI 303 and/or a database external to the specialized AI 303.

The response to the first communication may comprise data provided by the maestro AI 301. For example, the maestro AI 301 may intercept and/or monitor communications between the user device 306 and the specialized AI 303. Based on the communications, the maestro AI 301 may determine information and/or a response. The maestro AI 301 may prompt the specialized AI 303 to communicate the determined information and/or response to the user device 306.

At step 313, the user device 306 may send a second communication. The second communication may comprise a response to the response from the specialized AI 303, such as information that was requested. The second communication may comprise a request, such as for a service. The second communication may comprise a query. The user device 306 may send the second communication to the specialized AI 303. The maestro AI 301 may monitor and/or intercept network traffic to the specialized AI 303 and may examine the second communication. The user device 306 may send the second communication to the maestro AI 301. The user device 306 may send the second communication to the specialized AI 303 via the maestro AI 301, such as using the maestro AI 301 as a relay. The second communication may comprise a text communication. The second communication may comprise an audio communication.

Based on the second communication, the maestro device may determine to route the user device 306 to the human service provider device 312. For example, the maestro AI 301 may determine to route the user device 306 to the human service provider device 312 based on contents of the second communication, such as a type of request, a topic, and/or a type of information requested or provided, etc. For example, the maestro AI 301 may determine to route the user device 306 to the human service provider device 312 based on a keyword in the first communication. The maestro AI 301 may determine an emotion associated with the second communication and may determine to route the user device 306 to the human service provider device 312 based on the emotion. The maestro AI 301 may determine to route the user device 306 to the human service provider device 312 based on the human service provider being assigned to operations associated with a subject of the second communication. The human service operator may be better suited to receive and/or respond to the second communication. The second communication may comprise one or more keywords that are not recognized by the maestro AI 301 and/or the specialized AI 303. The second communication may request an operation that the specialized AI 303 is not configured to perform.

At step 314, the maestro AI 301 may send an indication of the second communication. The maestro AI 310 may send the indication of the second communication to the human service provider device 312. If the second communication comprises a packet or a stream of packets, the maestro AI 301 may generate a plain text message comprising contents and/or information from the packets. The maestro AI 301 may send the plain text message to the human service provider device 312. If the second communication comprises sensitive information, the maestro AI 301 may remove, encrypt, and/or flag the sensitive information in the message that is sent to the human service provider device 312.

The maestro AI 301 may route the user device 306 to the human service provider device 312. The maestro AI 301 may route the user device 306 to the human service provider device 312 by tearing down a communication session between the user device 306 and the specialized AI 303. The maestro AI 301 may route the user device 306 to the human service provider device 312 by setting up a communication session between the user device 306 and the human service provider device 312. If the specialized AI 303 comprises a thread and/or a process, the maestro AI 301 may route the user device 306 to the human service provider device 312 by terminating the thread and/or process comprising the first specialized AI 303.

The maestro AI 301 may send relevant data from the first communication to the human service provider device 312. The relevant data may comprise a transcript of the first communication and/or the response to the first communication. The relevant data may comprise a portion of the first communication and/or response to the first communication. The maestro AI 301 may determine the portion of the first communication and/or response to the first communication, such as based on the second communication. The maestro AI 301 may send the relevant data before sending the indication of the second communication, with the second communication, or after sending the second communication.

At step 315, the human service provider device 312 may send a response to the second communication. The human service provider device 312 may send the response to the second communication to the user device 306. The response may comprise a service, information, and/or a request for more information. The human service provider device 312 may determine the response based on the second communication, such as based on contents and/or emotion of the second communication.

The response to the second communication may comprise data provided by the maestro AI 301. For example, the maestro AI 301 may intercept and/or monitor communications between the user device 206 and the human service provider device 312. Based on the communications, the maestro AI 301 may determine information and/or a response. The maestro AI 301 may prompt the human service provider device 312 to communicate the determined information and/or response to the user device 306.

The transition between the specialized AI 303 and the human service provider device 312 may appear seamless to the user device 306 and/or a user of the user device 306. The transition may appear seamless based on sending the response to the first communication a period of time after the first communication was sent and/or received that is similar to or the same as a period of time between the sending and/or receiving of the second communication and the sending of the response to the second communication. The transition may appear seamless based on the specialized AI 303 and the human service provider device 312 using a similar generated voice and/or similar diction. The transition may appear seamless based on the maestro AI 301 providing information to the human service provider device 312, such as from communications between the user device 306 and the specialized AI 303 and/or from a database of information associated with the user device 306 and/or a user of the user device 306.

Figure 4:
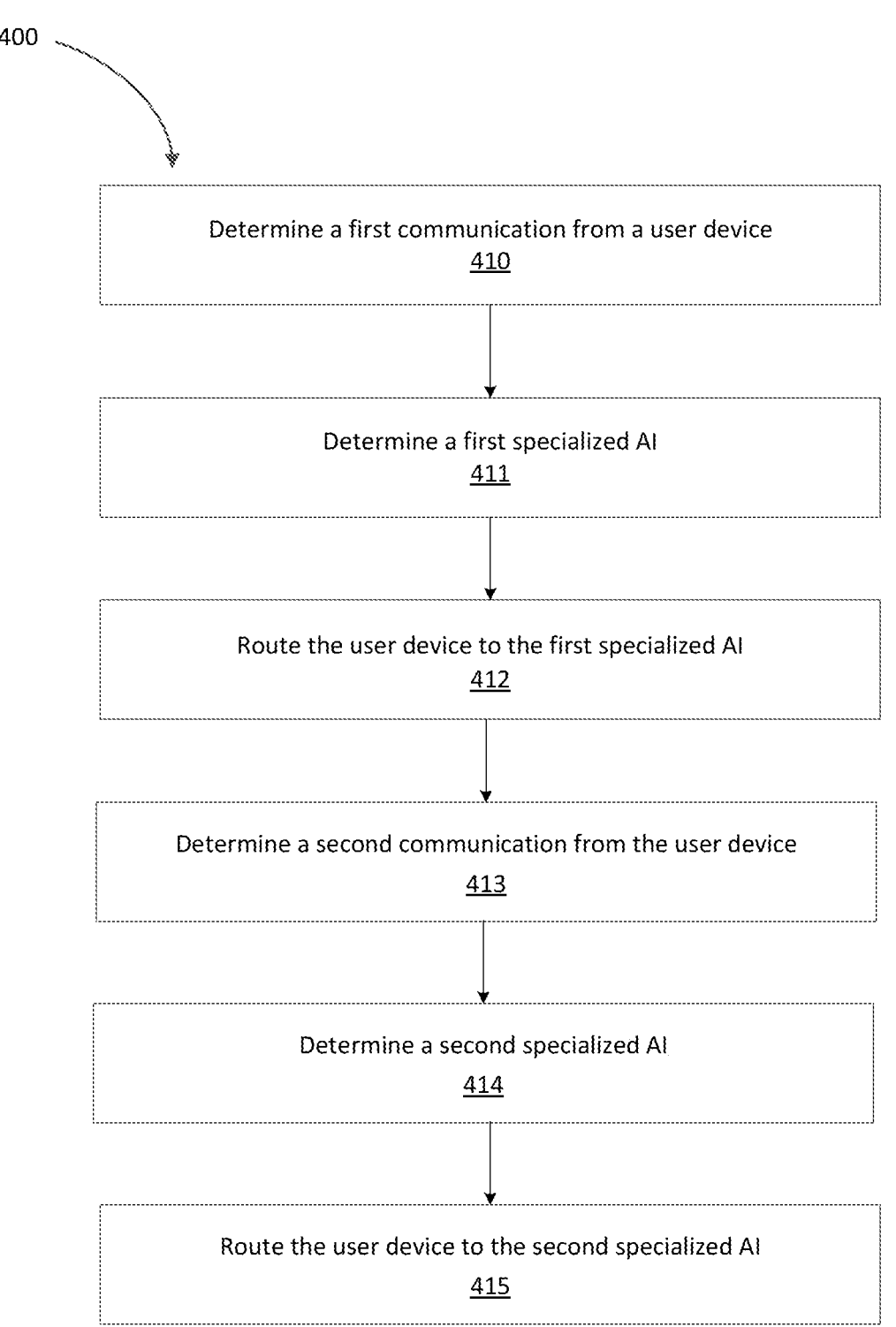
FIG. 4 shows an example hierarchical AI method.

FIG. 4 shows an example hierarchical AI method 400. The method 400 may be performed by a maestro AI (e.g., maestro AI 101 in FIG. 1, maestro AI 201 in FIG. 2, maestro AI 301 in FIG. 3). At step 410, the maestro AI may determine a first communication from a user device (e.g., user device 106 in FIG. 1, user device 206 in FIG. 2, user device 306 in FIG. 3). Determining the first communication may comprise receiving the first communication. Determining the first communication may comprise intercepting and/or monitoring the first communication. The first communication may comprise a request, such as a request for a service, assistance, and/or information. The first communication may comprise authentication information, such as a username, password, a digital certificate, and/or a key. The first communication may comprise a signal. The first communication may comprise a packet. The first communication may comprise a stream of packets. The first communication may comprise a text communication. The first communication may comprise an audio communication.

Based on the first communication, the maestro AI may authenticate the user device, such as using the authentication information. Authenticating the user device may comprise determining that the user device is associated with a user that is a member or subscriber of a service. Authenticating the user device may comprise determining that the user device is a trusted device.

At step 411, the maestro AI may determine a first specialized AI (e.g., specialized AI's 102 in FIG. 1, specialized AI's 203, 204 in FIG. 2, specialized AI 303 in FIG. 3) to which to route the user device. Based on the first communication, the maestro AI may determine the first specialized AI. The maestro AI may determine the first specialized AI based on contents of the first communication, such as a type of request, a topic, and/or a type of information requested or provided, etc. For example, the maestro AI may determine the first specialized AI based on a keyword in the first communication. The maestro AI may determine an emotion associated with the first communication and may determine the first specialized AI based on the emotion. The maestro AI may determine the first specialized AI based on past communications with the user device, such as based on a record of past communications with the user device stored to memory of the maestro AI or a database.

At step 412, the maestro AI may route the user device to the first specialized AI. Routing the user device to the first specialized AI may comprise sending an indication of the first communication. The maestro AI may send the indication of the first communication to the first specialized AI. If the first communication comprises a packet or a stream of packets, the maestro AI may send the packet and/or the stream of packets to the first specialized AI. The maestro AI may send an indication of the contents or subject of the first communication to the first specialized AI. If the first communication comprises sensitive information, the maestro AI may remove, encrypt, and/or flag the sensitive information.

Routing the user device to the first specialized AI may comprise setting up a communication session between the user device and the first specialized AI. If the specialized AI's comprise threads and/or processes, the maestro AI may initiate the thread and/or process comprising the first specialized AI.

The first specialized AI may send a response to the first communication. The first specialized AI may send the response to the first communication to the user device. The response may comprise a service, information, and/or a request for more information. The first specialized AI may determine the response based on the first communication, such as based on contents and/or emotion of the first communication. The first specialized AI may determine the response based on data stored to a memory of the specialized AI and/or a database external to the first specialized AI.

The response to the first communication may comprise data provided by the maestro AI. For example, the maestro AI may intercept and/or monitor communications between the user device and the first specialized AI. Based on the communications, the maestro AI may determine information and/or a response. The maestro AI may prompt the first specialized AI to communicate the determined information and/or response to the user device.

At step 413, the maestro AI may determine a second communication from the user device. The second communication may comprise a response to the response from the specialized AI, such as information that was requested. The second communication may comprise a request, such as for a service. The second communication may comprise a query. The user device may send the second communication to the first specialized AI and/or another specialized AI. The maestro AI may monitor and/or intercept network traffic to the specialized AI and may examine the second communication. The user device may send the second communication to the maestro AI. The user device may send the second communication to the specialized AI via the maestro AI, such as using the maestro AI as a relay. The second communication may comprise a text communication. The second communication may comprise an audio communication.

At step 414, the maestro device may determine a second specialized AI. The second specialized AI may comprise the first specialized AI. The second specialized AI may comprise a different AI than the first specialized AI.

The maestro AI may determine the second specialized AI based on the second communication. For example, the maestro AI may determine the second specialized AI based on contents of the second communication, such as a type of request, a topic, and/or a type of information requested or provided, etc. For example, the maestro AI may determine the second specialized AI based on a keyword in the first communication. The maestro AI may determine an emotion associated with the second communication and may determine the second specialized AI based on the emotion. The maestro AI may determine the second specialized AI based on the specialized AI comprising a device in the system that is assigned to operations associated with a subject of the second communication. The second specialized AI may be better suited to receive and/or respond to the second communication. For example, the second specialized AI may have access to a database with information needed to respond to the second communication. The second specialized AI may have computing resources needed to receive, process, and/or respond to the second communication.

At step 415, the maestro AI route the user device to the second specialized AI. Routing the user device to the second specialized AI may comprise sending an indication of the second communication. The maestro AI may send the indication of the second communication to the second specialized AI. If the second communication comprises a packet or a stream of packets, the maestro AI may send the packet or stream of packets to the second specialized AI. The maestro AI may send an indication of the contents or subject of the second communication to the second specialized AI. If the second communication comprises sensitive information, the maestro AI may remove, encrypt, and/or flag the sensitive information.

Routing the user device to the second specialized AI may comprise tearing down a communication session between the user device and the first specialized AI. The maestro AI may route the user device to the second specialized AI by setting up a communication session between the user device and the second specialized AI. If the specialized AI's comprise threads and/or processes, the maestro AI may terminate the thread and/or process comprising the first specialized AI. The maestro AI initiate the thread and/or process comprising the second specialized AI.

The maestro AI may send relevant data from the first communication to the second specialized AI. The relevant data may comprise a transcript of the first communication and/or the response to the first communication. The relevant data may comprise a portion of the first communication and/or response to the first communication. The maestro AI may determine the portion of the first communication and/or response to the first communication, such as based on the second communication. The maestro AI may send the relevant data before sending the indication of the second communication, with the second communication, or after sending the second communication.

The specialized AI may send a response to the second communication. The second specialized AI may send the response to the second communication to the user device. The response may comprise a service, information, and/or a request for more information. The specialized AI may determine the response based on the second communication, such as based on contents and/or emotion of the second communication. The second specialized AI may determine the response based on data stored to a memory of the second specialized AI and/or a database external to the second specialized AI.

The response to the second communication may comprise data provided by the maestro AI. For example, the maestro AI may intercept and/or monitor communications between the user device and the second specialized AI. Based on the communications, the maestro AI may determine information and/or a response. The maestro AI may prompt the second specialized AI to communicate the determined information and/or response to the user device.

The transition between the first specialized AI and the second specialized AI may appear seamless to the user device and/or a user of the user device. The transition may appear seamless based on the first specialized AI sending the response to the first communication a period of time after the first communication was sent and/or received that is similar to or the same as a period of time between the sending and/or receiving of the second communication and the sending of the response to the second communication. The transition may appear seamless based on the first specialized AI and the second specialized AI using a similar generated voice and/or similar diction. The transition may appear seamless based on the maestro AI providing information to the second specialized AI, such as from communications between the user device and the first specialized AI and/or from a database of information associated with the user device and/or a user of the user device.

Figure 5:
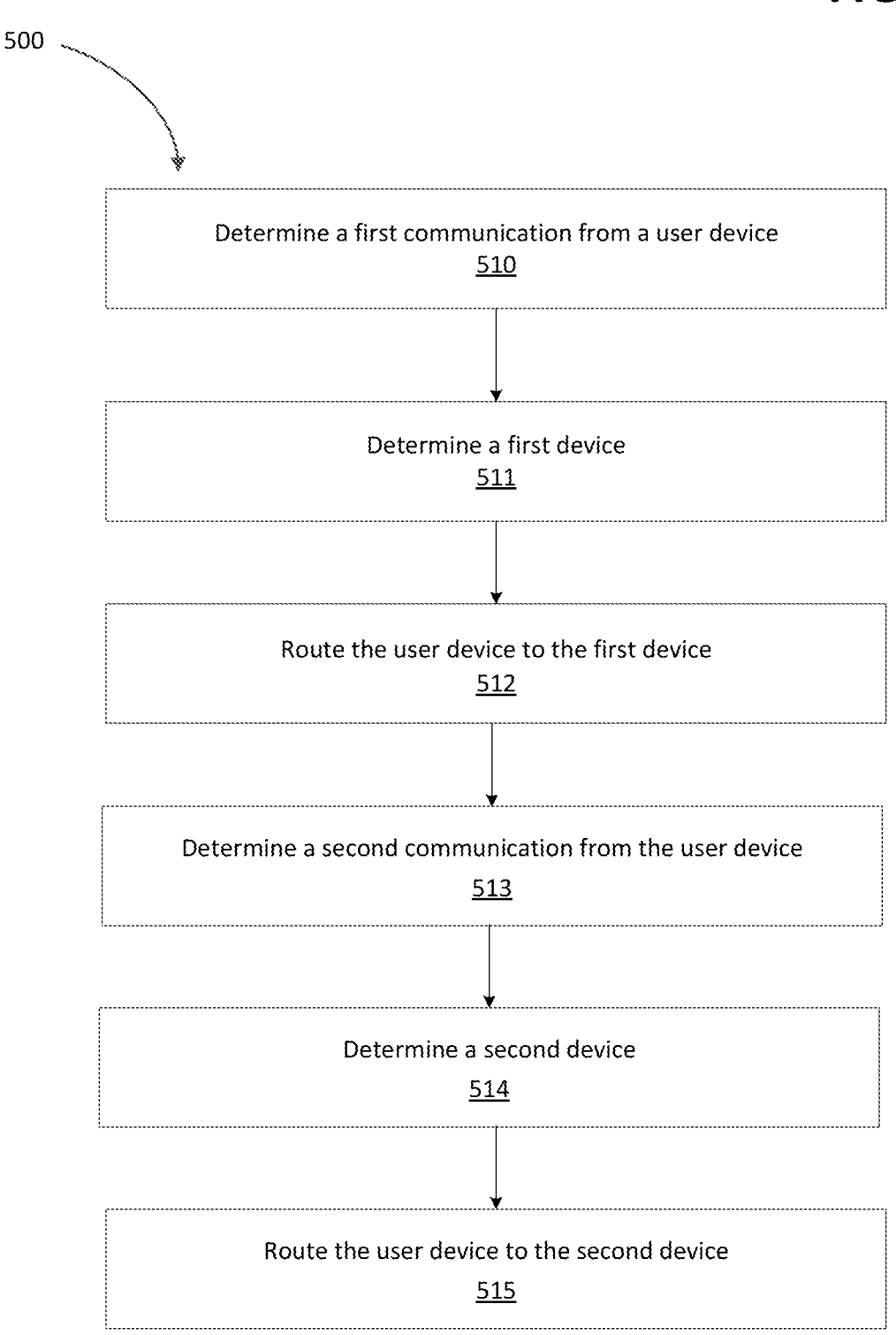
FIG. 5 shows an example hierarchical AI method.

FIG. 5 shows an example hierarchical AI method 500. The method 500 may be performed by a maestro AI (e.g., maestro AI 101 in FIG. 1, maestro AI 201 in FIG. 2, maestro AI 301 in FIG. 3). At step 410, the maestro AI may determine a first communication from a user device (e.g., user device 106 in FIG. 1, user device 206 in FIG. 2, user device 306 in FIG. 3). Determining the first communication may comprise receiving the first communication. Determining the first communication may comprise intercepting and/or monitoring the first communication. The first communication may comprise a request, such as a request for a service, assistance, and/or information. The first communication may comprise authentication information, such as a username, password, a digital certificate, and/or a key. The first communication may comprise a signal. The first communication may comprise a packet. The first communication may comprise a stream of packets. The first communication may comprise a text communication. The first communication may comprise an audio communication.

Based on the first communication, the maestro AI may authenticate the user device, such as using the authentication information. Authenticating the user device may comprise determining that the user device is associated with a user that is a member or subscriber of a service. Authenticating the user device may comprise determining that the user device is a trusted device.

At step 511, the maestro AI may determine a first device. The maestro AI may determine a first device to which to route the user device. The first device may comprise a specialized AI (e.g., specialized AI's 102 in FIG. 1, specialized AI's 203, 204 in FIG. 2, specialized AI 303 in FIG. 3). The first device may comprise a human service provider device (e.g., human service provider device 112 in FIG. 1, human service provider device 312 in FIG. 3).

Based on the first communication, the maestro AI may determine the first device. The maestro AI may determine the first device based on contents of the first communication, such as a type of request, a topic, and/or a type of information requested or provided, etc. For example, the maestro AI may determine the first device based on a keyword in the first communication. The maestro AI may determine an emotion associated with the first communication and may determine the first device based on the emotion. The maestro AI may determine the first device based on past communications with the user device, such as based on a record of past communications with the user device stored to memory of the maestro AI or a database.

At step 512, the maestro AI route the user device to the first device. Routing the user device to the first device may comprise sending an indication of the first communication. The maestro AI may send the indication of the first communication to the first device. If the first communication comprises a packet or a stream of packets, the maestro AI may send the packet and/or the stream of packets to the first device. The maestro AI may send an indication of the contents or subject of the first communication to the first device. If the first communication comprises sensitive information, the maestro AI may remove, encrypt, and/or flag the sensitive information.

The maestro AI may route the user device to the first device by setting up a communication session between the user device and the first device. If the specialized AI's comprise threads and/or processes, the maestro AI may initiate the thread and/or process comprising the first device.

The first device may send a response to the first communication. The first device may send the response to the first communication to the user device. The response may comprise a service, information, and/or a request for more information. The first device may determine the response based on the first communication, such as based on contents and/or emotion of the first communication. The first device may determine the response based on data stored to a memory of the specialized AI and/or a database external to the first device.

The response to the first communication may comprise data provided by the maestro AI. For example, the maestro AI may intercept and/or monitor communications between the user device and the first device. Based on the communications, the maestro AI may determine information and/or a response. The maestro AI may prompt the first device to communicate the determined information and/or response to the user device.

At step 513, the maestro AI may determine a second communication from the user device. The second communication may comprise a response to the response from the specialized AI, such as information that was requested. The second communication may comprise a request, such as for a service. The second communication may comprise a query. The user device may send the second communication to the specialized AI. The maestro AI may monitor and/or intercept network traffic to the specialized AI and may examine the second communication. The user device may send the second communication to the maestro AI. The user device may send the second communication to the specialized AI via the maestro AI, such as using the maestro AI as a relay. The second communication may comprise a text communication. The second communication may comprise an audio communication.

At step 514, the maestro device may determine a second device. The second device may comprise the same device as the first device. The second device may comprise a different device than the first device. The second device may comprise a specialized AI. The second device may comprise a human customer service provider device. The maestro AI may determine the second device based on the second communication. For example, the maestro AI may determine the second device based on contents of the second communication, such as a type of request, a topic, and/or a type of information requested or provided, etc. For example, the maestro AI may determine the second device based on a keyword in the first communication. The maestro AI may determine an emotion associated with the second communication and may determine the second device based on the emotion. The maestro AI may determine the second device based on the second device comprising a device in the system that is assigned to operations associated with a subject of the second communication. The second device may be better suited to receive and/or respond to the second communication. For example, the second device may have access to a database with information needed to respond to the second communication. The second device may have computing resources needed to receive, process, and/or respond to the second communication.

At step 515, the maestro AI may route the user device to the second device. Routing the user device to the second device may comprise sending an indication of the second communication. The maestro AI may send the indication of the second communication to the second device. If the second communication comprises a packet or a stream of packets, the maestro AI may send the packet or stream of packets to the second device. The maestro AI may send an indication of the contents or subject of the second communication to the second device. If the second communication comprises sensitive information, the maestro AI may remove, encrypt, and/or flag the sensitive information.

The maestro AI may route the user device to the second device by tearing down a communication session between the user device and the first device. The maestro AI may route the user device to the second device by setting up a communication session between the user device and the second device.

The maestro AI may send relevant data from the first communication to the second device. The relevant data may comprise a transcript of the first communication and/or the response to the first communication. The relevant data may comprise a portion of the first communication and/or response to the first communication. The maestro AI may determine the portion of the first communication and/or response to the first communication, such as based on the second communication. The maestro AI may send the relevant data before sending the indication of the second communication, with the second communication, or after sending the second communication.

The second device may send a response to the second communication. The second device may send the response to the second communication to the user device. The response may comprise a service, information, and/or a request for more information. The second device may determine the response based on the second communication, such as based on contents and/or emotion of the second communication. The second device may determine the response based on data stored to a memory of the specialized AI and/or a database external to the second device.

The response to the second communication may comprise data provided by the maestro AI. For example, the maestro AI may intercept and/or monitor communications between the user device and the second device. Based on the communications, the maestro AI may determine information and/or a response. The maestro AI may prompt the second device to communicate the determined information and/or response to the user device.

The transition between the first device and the second device may appear seamless to the user device and/or a user of the user device. The transition may appear seamless based on the first device sending the response to the first communication a period of time after the first communication was sent and/or received that is similar to or the same as a period of time between the sending and/or receiving of the second communication and the sending of the response to the second communication. The transition may appear seamless based on the first device and the second device using a similar generated voice and/or similar diction. The transition may appear seamless based on the maestro AI providing information to the second device, such as from communications between the user device and the first device and/or from a database of information associated with the user device and/or a user of the user device.

Figure 6:
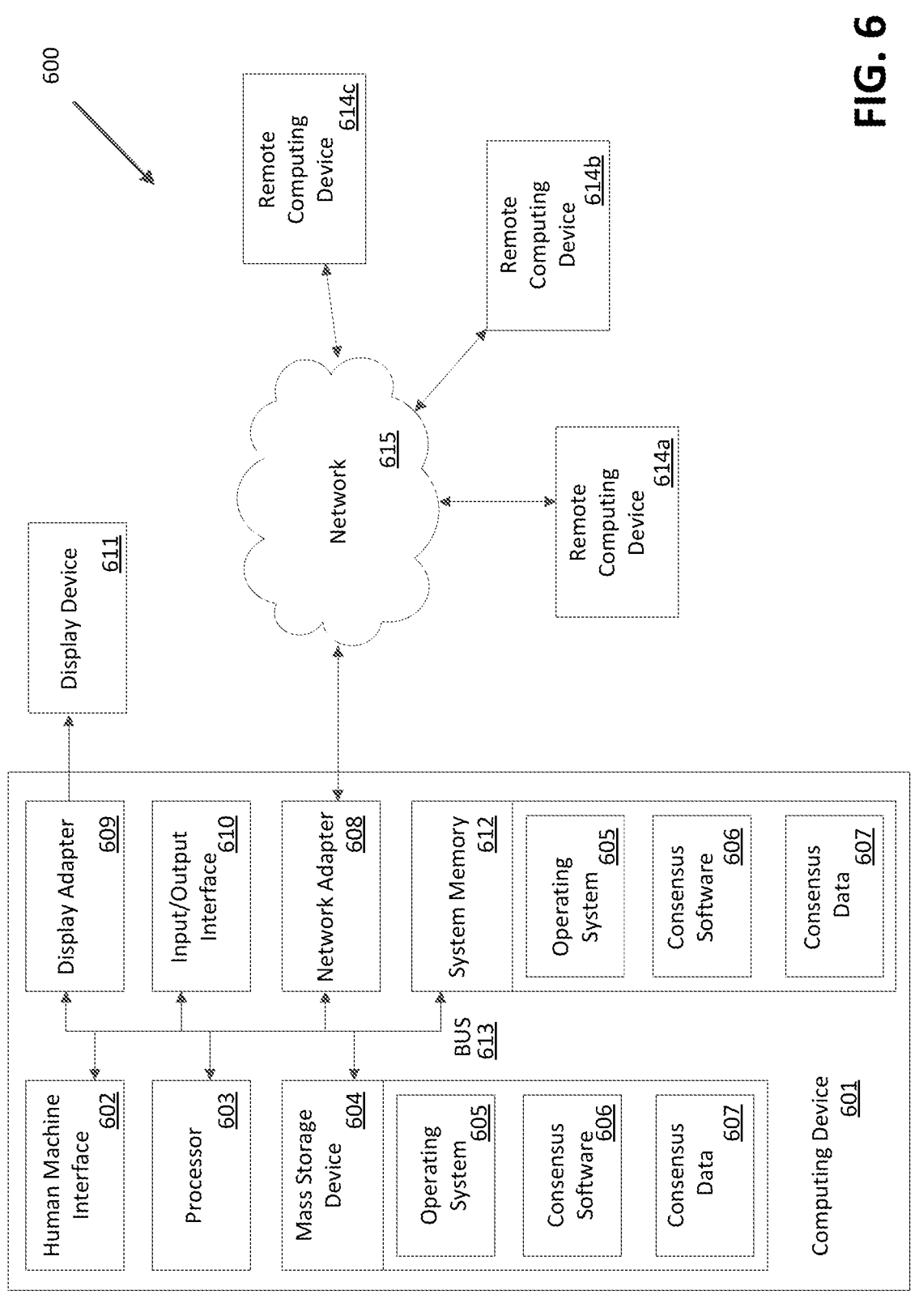
FIG. 6 shows an example computing environment.

FIG. 6 shows an example computing environment. The systems, methods, and apparatuses described herein may be implemented on a computing device such as a computing device 601 (e.g., computer) as shown in FIG. 6 and described below. Any of the components of the hierarchical AI system 100 in FIG. 1, the hierarchical AI system 200 in FIG. 2, and/or the hierarchical AI system 300 in FIG. 3 may comprise a computing device as shown in FIG. 6. Similarly, the methods, systems, and apparatuses disclosed may utilize one or more computing device to perform one or more functions in one or more locations. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 601. The components of the computing device 601 may comprise, but are not limited to, one or more processors 603, a system memory 612, and a system bus 613 that couples various system components including the processor 603 to the system memory 612. With multiple processors 503, the system may utilize parallel computing.

The system bus 613 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description may be implemented over a wired or wireless network connection and each of the subsystems, including the processor 603, a mass storage device 604, an operating system 605, data distillation software 606, data distillation data 607, a network adapter 608, system memory 612, an Input/Output Interface 610, a display adapter 609, a display device 611, and a human machine interface 602, may be contained within one or more remote computing devices 614*a,b,c* at physically separate locations, connected through buses of this form, in effect implementing a fully distributed system.

The computing device 601 typically comprises a variety of computer readable media. Readable media may be any available media that is accessible by the computing device 601 and comprises both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as data distillation data 607 and/or program modules such as operating system 605 and data distillation software 606 that are immediately accessible to and/or are presently operated on by the processor 603.

The computing device 601 may comprise other removable/non-removable, volatile/non-volatile computer storage media. FIG. 6 shows a mass storage device 504 which may provide non-volatile storage of computer code, computer readable instructions, data structures, program modules, and other data for the computing device 601. A mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 604, including an operating system 605 and data distillation software 606. Each of the operating system 605 and data distillation software 606 (or some combination thereof) may comprise elements of the programming and the data distillation software 606. Data distillation data 607 may be stored on the mass storage device 604. Data distillation data 607 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 601 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 603 via a human machine interface 602 that is coupled to the system bus 613, but may be connected by other interface and bus structures, such as a parallel port, game port, an IEEE 694 Port (also known as a Firewire port), a serial port, or a universal serial bus (USB).

A display device 611 may be connected to the system bus 613 via an interface, such as a display adapter 609. It is contemplated that the computing device 601 may have more than one display adapter 609 and the computing device 601 may have more than one display device 611. A display device may be a monitor, an LCD (Liquid Crystal Display), or a projector. Output peripheral devices may comprise components such as speakers (not shown) and a printer (not shown) which may be connected to the computing device 601 via Input/Output Interface 610. Any step and/or result of the methods may be output in any form to an output device. Such output may be any form of visual representation, including, but not limited to, textual, graphical, animation, audio, tactile, and the like. The display 611 and computing device 601 may be part of one device, or separate devices.

The computing device 601 may operate in a networked environment using logical connections to one or more remote computing devices 614*a,b,c*. A remote computing device may be a personal computer, portable computer, smartphone, a server, a router, a network computer, a peer device or other common network node, and so on. Logical connections between the computing device 601 and a remote computing device 614*a,b,c* may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the data processor(s) of the computer. An implementation of data distillation software 606 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:

1. A method comprising:
receiving, by a server, a first communication from a user device;

determining that the first communication relates to a first issue among a plurality of possible issues;
determining, using a maestro artificial intelligence (AI) hosted by the server and based on the first issue, a first artificial intelligence (AI) device of a plurality of AI devices, wherein the first AI device is configured to respond to the first communication with respect to the first issue, wherein the maestro AI was trained using communications relating to the plurality of possible issues, and wherein the first AI device was trained using communications relating to the first issue;
configuring, based on the first communication, the first AI device to communicate with the user device by employing a first artificial voice having one or more vocal characteristics comprising at least one of pitch, tone, pace, diction or inflection;
routing the user device to the first AI device, wherein the first AI device responds to the first communication within a first response time using the first artificial voice;
receiving a second communication from the user device;
determining a user emotion of the user from the second communication;
determining that the second communication relates to a second issue among the plurality of possible issues;
determining, using the maestro artificial intelligence (AI) hosted by the server and based on the second issue, a second AI device of the plurality of AI devices, wherein the second AI device is configured to respond to the second issue;
configuring, based on the second communication, the second AI device to communicate with the user device by employing a second artificial voice that has one or more vocal characteristics, wherein if the user emotion is positive or neutral the second artificial voice matches the first artificial voice of the first AI device, and wherein if the user emotion is negative the second artificial voice changes the one or more vocal characteristics from the one or more vocal characteristics of the first artificial voice;
routing the user device to the second AI device; and
configuring the second AI device to respond to a second communication from the user device using the second artificial voice within a second response time that matches the first response time of the first AI device.

2. The method of claim 1, wherein the first communication comprises an indication of an operation; and
wherein the determining the first AI device comprises determining that the first AI device is configured to perform the operation.

3. The method of claim 1, wherein the routing the user device to the second device comprises sending, to the second device, data from a response sent by the first AI device to the user device.

4. The method of claim 1, further comprising routing the user device to a human operator and sending the human operator an indication of at least a portion of a communication between the user device and at least one of the first AI device or the second AI device.

5. The method of claim 1, wherein the determining the first communication from the user device comprises converting at least a portion of the first communication from speech to text; and
wherein the routing the user device to the second AI device comprises sending the second AI device at least a portion of the text.

6. The method of claim 1, further comprising:

determining a change in topic; and routing the user device to one of a plurality of AI devices based on the change in topic.

7. The method of claim 1, further comprising:

determining the first response time; and receiving, by the server, the second communication from the user device.

8. The method of claim 1, comprising:

providing an encryption key or digital certificate for communication with the user device to the second AI before routing the user device to the second AI device comprises; and authentication the user device and the second AI before responding to the second communication.

9. A system comprising:

a plurality of artificial intelligence (AI) devices; and a maestro AI device among the plurality of AI devices configured to:

receive a first communication from a user device;

determine that the first communication relates to a first issue among a plurality of possible issues;

determine, based on the first issue, a first artificial intelligence (AI) device of the plurality of AI devices, wherein the first AI device is configured to respond to the first communication with respect to the first issue, wherein the maestro AI was trained using communications relating to the plurality of possible issues, and wherein the first AI device was trained using communications relating to the first issue;

configure, based on the first communication, the first AI device to communicate with the user device by employing a first artificial voice having one or more vocal characteristics comprising at least one of pitch, tone, pace, diction or inflection;

route the user device to the first AI device, wherein the first AI device responds to the first communication within a first response time using the first artificial voice;

receive a second communication from the user device;

determine a user emotion of the user from the second communication;

determine that the second communication relates to a second issue among the plurality of possible issues;

determine, based on the second issue, a second AI device of the plurality of AI devices, wherein the second AI is configured to respond to the second issue;

configure, based on the second communication, the second AI device to communicate with the user device by employing a second artificial voice that has one or more vocal characteristics, wherein if the user emotion is positive or neutral the second artificial voice matches the first artificial voice of the first AI device, and wherein if the user emotion is negative the second artificial voice changes the one or more vocal characteristics from the one or more vocal characteristics of the first artificial voice;

route the user device to the second AI device; and configure the second AI device to respond to a second communication from the user device using the second artificial voice within a second response time that matches the first response time of the first AI device.

10. The system of claim 9, wherein the second AI device is configured to utilize a communication style of the first AI device.

11. The system of claim 9, wherein the maestro AI is configured to:

route the user device from a human operator to the first AI device; and cause output by the first AI device of generated speech having at least one similar vocal characteristic to a voice of the human operator.

12. The system of claim 9, wherein the maestro AI device is configured to terminate an operation performed by at least one of the first AI device or the second AI device.

13. The system of claim 9, wherein the maestro AI device is configured to at least one of grant or deny access to data to at least one of the first AI device or the second AI device.

14. The system of claim 9, wherein the first AI device is configured to respond using a first set of responses and the second AI device is configured to respond using a second set of responses different than the first set of responses.

15. The system of claim 9, wherein the maestro AI is configured to:

determine a change in topic; and route the user device to one of a plurality of AI devices based on the change in topic.

16. A non-transitory computer-readable medium comprising instructions that, when executed, cause operations comprising:

receiving, by a maestro artificial intelligence (AI), a first communication from a user device;

determining that the first communication relates to a first issue among a plurality of possible issues;

determining, by the maestro AI and based the first issue, a first AI of a plurality of AIs, wherein the first AI is configured to respond to the first communication with respect to the first issue, wherein the maestro AI was trained using communications relating to the plurality of possible issues, and wherein the first AI was trained using communications relating to the first issue;

configuring, based on the first communication, the first AI to communicate with the user device by employing a first artificial voice having one or more vocal characteristics comprising at least one of pitch, tone, pace, diction or inflection;

routing, by the maestro AI, the user device to the first AI, wherein the first AI responds to the first communication within a first response time using the first artificial voice;

receiving a second communication from the user device;

determining a user emotion of the user from the second communication;

determining that the second communication relates to a second issue among the plurality of possible issues;

determining, by the maestro AI and based a second of the issue, a second AI of the plurality of AI's, wherein the second AI is configured to respond to the second issue;

configuring, based on the second communication, the second AI to communicate with the user device by employing a second artificial voice that has one or more vocal characteristics, wherein if the user emotion is positive or neutral the second artificial voice matches the first artificial voice of the first AI, and wherein if the user emotion is negative the second artificial voice changes the one or more vocal characteristics from the one or more vocal characteristics of the first artificial voice;

routing, by the maestro AI, the user device to the second AI; and configuring the second AI to respond to a second communication from the user device using the second artificial voice within a second response time that matches the first response time of the first AI.

17. The non-transitory computer-readable medium of claim 16, wherein the maestro AI and at least one of the first AI or the second AI reside on a same device.

18. The non-transitory computer-readable medium of claim 17, wherein the maestro AI comprises a first processor and the at least one of the first AI or the second AI comprises a second processor.

19. The non-transitory computer-readable medium of claim 17, wherein the maestro AI has access to a memory and the at least one of the first AI or the second AI does not have access to the memory.

20. The non-transitory computer-readable medium of claim 16, comprising:

receiving a second communication from the user device;

determining a change in emotion in the second communication as compared to the first communication; and routing the user device to one of a plurality of AIs based on the change in emotion.

21. The non-transitory computer-readable medium of claim 16, wherein the routing the user device to the second AI comprises sending the second AI at least a portion of a communication between the user device and the first AI.

* * * * *